United States Patent [19]

Maeda et al.

[11] Patent Number: 4,583,853
[45] Date of Patent: Apr. 22, 1986

[54] RATIO TYPE DOUBLE-BEAM SPECTROPHOTOMETER

[75] Inventors: Hirohumi Maeda; Yoshiro Fukasawa; Makoto Kobayashi, all of Tokyo, Japan

[73] Assignee: Japan Spectroscopic Co., Ltd., Hachioji, Japan

[21] Appl. No.: 585,588

[22] Filed: Mar. 2, 1984

[30] Foreign Application Priority Data

Mar. 5, 1983 [JP] Japan ................................. 58-36296

[51] Int. Cl.$^4$ .............................. G01J 3/08; G01J 3/42
[52] U.S. Cl. ..................................... 356/323; 250/343; 250/351; 356/325
[58] Field of Search ..................... 356/323, 324, 325; 250/343, 347, 351, 352, 353

[56] References Cited

U.S. PATENT DOCUMENTS

3,521,958 7/1970 Treharne .......................... 356/323
4,305,664 12/1981 Akitomo ........................... 356/323

Primary Examiner—Vincent P. McGraw
Attorney, Agent, or Firm—Wenderoth, Lind & Ponack

[57] ABSTRACT

In a ratio-type double-beam infrared spectrophotometer, an output signal of the photodetector is frequency discriminated to derive therefrom a component having a fundamental frequency f corresponding to at least one of the sample and reference beam intensities and another component having a frequency 2f corresponding to at least the other beam intensity, and these frequency components are computed to determine the ratio of the sample beam intensity to the reference beam intensity. According to the invention, the component of fundamental frequency f is synchronously rectified into a rectified signal which is further differentiated into a differential value, the differential value is subtracted from the rectified signal to give a signal which is compensated for rapid changes of spectral absorption due to the presence of $H_2O$ and $CO_2$ in the beam paths during wavelength scanning and is used as the f-component signal.

8 Claims, 18 Drawing Figures

RATIO TYPE DOUBLE-BEAM SPECTROPHOTOMETER

BACKGROUND OF THE INVENTION

This invention relates to double-beam infrared spectrophotometers of electrical direct ratio system, and more particularly, to such ratio system spectrophotometers capable of phase compensation by minimizing the noise resulting from phase deviations caused by rapid absorption in the frequency component detecting system.

As is well known in the art, the double beam spectrophotometers measure the transmittance of a sample by causing light to alternately enter the sample and a reference or standard material (or an empty cell), measuring the intensity of a sample beam that has passed the sample and a reference or standard beam that has passed the reference or standard material, and comparing the sample beam intensity with the reference beam intensity, with the resultant ratio giving the transmittance of the sample. The signal processing method in such double beam spectrophotometers, that is, the method of automatically outputting the transmittance of the sample is generally classified into the optical null balance system widely used in conventional infrared spectrophotometers, the electrical direct ratio system, and the automatic gain control system, of which the latter two were recently developed.

The optical null system measures the transmission of a sample by alternately switching a sample beam and a reference beam attenuated by a mechanical beam attenuator, taking out an AC signal having an amplitude proportional to the difference $(I_0-I)$ between the reference beam intensity $I_0$ and the sample beam intensity $I$, using this signal as an error signal in a closed loop, thereby automatically adjusting the mechanical attenuator associated with the reference beam such that the value of the difference $(I_0-I)$ may always become zero. When the attenuator is adjusted in this way, the magnitude of beam attenuation itself, that is, the distance of movement in the attenuator is proportional to the transmittance so that changes in the transmittance of a sample can be recorded by recording the movement of the attenuator.

The above mentioned optical null system is best with respect to percent utilization of signals and stability of measurement, but has several drawbacks described below. First of all, since the accuracy of transmittance largely depends on the mechanical accuracy of the attenuator itself as well as the associated drive system, the spectrophotometer is difficult to exhibit highly accurate and stable performance. In connection with this, due to fluctuations in rotation of a servo motor for driving a wedge-shaped stop commonly used in the attenuator, errors in linearity of a potentiometer for detecting the position of the wedge-shaped stop, and other factors, the distance of movement of the stop is not always proportional to the magnitude of attenuation, often resulting in low accuracy of transmittance measurement. Further, the inclusion of the optical system in the servo loop results in a complicated and expensive apparatus which handles signals in a complicated way and has poor response. In the case of a sample having high absorbance, the sample beam intensity approximates to zero, and accordingly, the reference beam intensity is also attenuated to a level near zero, resulting in reduced loop gain and reduced reliability.

In addition, the attenuator itself is reduced in accuracy when the degree of attenuation is very high, that is, when the sample has very high absorbance. These undesirably causes a substantial reduction in accuracy of measurement of a high absorbance sample.

The automatic gain control system which does not use a beam attenuator is a system in which time division is made by beam path switching means such as a sector mirror to allocate fractions to sample and reference beams and dark state when both sample and reference beams are interrupted, and the gain of signal processing means, for example, the gain of a detector or an amplifier is automatically controlled such that the reference beam intensity may always be at a constant level. In this system, an output of the amplifier corresponding to a sample beam directly corresponds to the ratio of sample beam intensity to reference beam intensity, that is, the transmittance of the sample. The transmittance is then directly available simply by sample holding an output of the amplifier corresponding to a sample beam. This system uses a gain controllable detector, for example, photomultiplier as the detector. When the detector gain is controlled in a feedback manner, all electric signal systems are contained in this loop so that the linearity and stability of detector and amplifier have no influence on measurement, insuring high accuracy in measurement. Further, because of the absence of a beam attenuator and a mechanical servo system and the possible setting of absolute zero, this system has eliminated most of the drawbacks of the optical null system. However, infrared spectrophotometers carring out spectral analysis in the infrared region must use thermal detectors such as thermocouples. The thermal detectors are difficult to control their sensitivity and thus incompatible with the automatic gain control system. A spectrophotometer may be constructed using a thermal detector such that the thermal detector is connected to control the gain of an amplifier. However, since the thermal detector has a considerably slower speed of response and a considerably larger time constant than a photomultiplier detector used in visible-to-ultraviolet spectrophotometers, and the output waveform of the thermal detector does not correspond to the waveform representative of changes of the beam which has passed the beam path switching means, it is difficult to devise a practical automatic gain control system using a thermal detector.

The electrical direct ratio system does not use a beam attenuator and is a system in which an output signal of a photodetector containing in admixture components corresponding to the intensities of sample and reference beams is amplified by a common amplifier before the individual components are electrically separated and the ratio of the individual components is electrically computed. This system is generally subdivided into two systems, frequency component detection system and phase discrimination system, depending on how to separate and take out components representative of sample and reference beam intensities from the amplifier output. In either case, separation of signal components can be carried out even when thermal detectors such as thermocouples are used. Consequently, this system is adaptable to infrared spectrophotometers.

Among prior art spectrophotometers of the electrical direct ratio system, specifically the frequency component detection system is one disclosed in Japanese Patent Application Kokai No. SHO 52-10790 (published on Jan. 27, 1977). This spectrophotometer uses as beam path switching means for interrupting and switching beam paths for sample and reference beams, a sector mirror capable of alternately discontinuing the sample and reference beams at a given frequency f and a chopper capable of discontinuing the sample and reference beams from the sector mirror at a frequency 2f twice the frequency f of the sector mirror. Since a component having frequency f in an output signal of the detector corresponds to the difference ($I_0 - I$) between the reference beam intensity $I_0$ and the sample beam intensity I, and a component having frequency 2f corresponds to the sum ($I_0 + I$) of the reference beam intensity $I_0$ and the sample beam intensity I, an output proportional to $I_0$ is obtained by adding the components having frequencies f and 2f and another output proportional to I is obtained by subtracting the one component from the other component. The value of $I/I_0$ may be obtained by computing the ratio of these outputs.

Also known as the electrical direct ratio determining double-beam spectrophotometers based on the frequency component detection system is one wherein a chopper having a chopping frequency f is located in the sample beam path, another chopper having a chopping frequency 2f is located in the reference beam path, and a half mirror is provided so as to guide the sample and reference beams into a common beam path to enter a photodetector through a monochromator. With this arrangement, that component of the output signal of the photodetector which has frequency f is proportional to the intensity of the sample beam intensity and that component of the photodetector output which has frequency 2f is proportional to the reference beam intensity.

In the general practice of spectrophotometers, the monochromator is operated so as to sequentially change the wavelength of detection, that is, so-called wavelength scanning is carried out, thereby determining changes in the absorbance of the sample in response to such wavelength changes. However, in the case of infrared spectrophotometers, as wavelength scanning is carried out in the presence of atmospheric $H_2O$ and $CO_2$ in the beam paths, it has been observed that specific absorption by $H_2O$ and $CO_2$ rapidly changes in a certain wavelength region. Such rapid changes of absorption due to $H_2O$ and $CO_2$ will result in rapid changes of the incident energy to the photodetector, which cause the output waveform of the photodetector to be deformed, resulting in phase deviations. In general, such changes of absorption due to $H_2O$ and $CO_2$ in air will occur to a substantially equal extent in the sample and reference beam paths, and the spectrophotometer of the electrical direct ratio system is designed to determine the absorbance of a sample from the direct ratio of the sample beam intensity to the reference beam intensity. At first sight, it is considered that the absorption by $H_2O$ and $CO_2$ in the sample beam path and the absorption by $H_2O$ and $CO_2$ in the reference beam path are mutually cancelled in computing the direct ratio, giving no influence on the output data indicative of the absorbance of the sample. Nevertheless, in the frequency component detection system designed to measure the absorbance of a sample by detecting mutually different frequency components and determining the ratio of them, the above-mentioned rapid absorption changes affect to different extents at different frequencies, and thus changes of absorption due to $H_2O$ and $CO_2$ are not actually cancelled from a measurement of the absorbance of the sample, introducing measurement errors in the output data. More specifically, rapid changes of absorption due to $H_2O$ and $CO_2$, that is, rapid changes of the incident energy to the photodetector induce phase deviations in the output signal of the photodetector. Since a filter having sensitive phase characteristics is used for the frequency discrimination of the output signal of the photodetector, noise is introduced into the output of the filter to different extents at different frequencies. As a result, a measurement of the absorbance obtained by computing the frequency components does not represent a correct sample-to-reference ratio.

It is, therefore, an object of the present invention to provide a spectrophotometer which has eliminated the above-described drawbacks of both the optical null balance system and the frequency component detection system.

It is another object of the present invention to provide a spectrophotometer based on the frequency component detection system and the electrical direct ratio system in which the occurrence of errors due to phase deviations encountered where absorption is rapidly changed by $H_2O$ and $CO_2$ in air is minimized.

It is a further object of the present invention to provide electrical processing means for compensating for the above-described phase deviations because the phase deviations are proportional to changes of the incident radiation energy to a photodetector.

SUMMARY OF THE INVENTION

According to the present invention, there is provided a ratio type double-beam spectrophotometer comprising a light source for emitting a beam of light; a monochromator; an optical system, including reference and sample beam paths, for distributing the beam from the source between the reference and sample beam paths to form reference and sample beams and for guiding the reference and sample beams along a common beam path toward the monochromator; a reference cell inserted in the reference beam path; a sample cell inserted in the sample beam path; a photodetector located downstream of said monochromator for detecting the intensity of monochromatic light from the monochromator; and signal processing means electrically connected to the photodetector for processing an output signal thereof. The optical system is constructed such that the output signal of the photodetector is a composite signal in which a first frequency component correlated to at least one of the intensity of the light beam transmitted by the sample cell (to be referred to as sample beam intensity) and the intensity of the light beam transmitted by the reference cell (to be referred to as reference beam intensity) is combined with a second frequency component correlated to at least the other of the sample beam intensity and the reference beam intensity and corresponding to a frequency integral times as high as the frequency of the first frequency component. The signal processing means includes discriminator means for discriminating the output signal of the photodetector into the first frequency component and the second frequency component; a first synchronous rectifier connected to the discriminator means for synchronously rectifying the first frequency component therefrom; a second synchronous rectifier connected to the discriminator means for synchronously rectifying the second frequency component therefrom; and computing means for computing the outputs of the first and second synchronous rectifiers to yield the ratio of the sample beam intensity to the reference beam intensity.

According to a first aspect of the present invention, a differentiation circuit is connected to the first synchronous rectifier for differentiating the output signal thereof, subtraction means is connected to the first synchronous rectifier and the differentiation circuit for subtracting the output of the differentiation circuit from the output of the first rectifier, and the computing means is connected to the first synchronous rectifier through the differentiation circuit and the subtraction means while the computing means is directly connected to the second synchronous rectifier.

BRIEF DESCRIPTION OF THE DRAWINGS

The above and other objects, features, and advantages of the present invention will be more fully understood by reading the following description when taken in conjunction with the accompanying drawings, in which.

DESCRIPTION OF THE PREFERRED EMBODIMENTS

Figure 1:
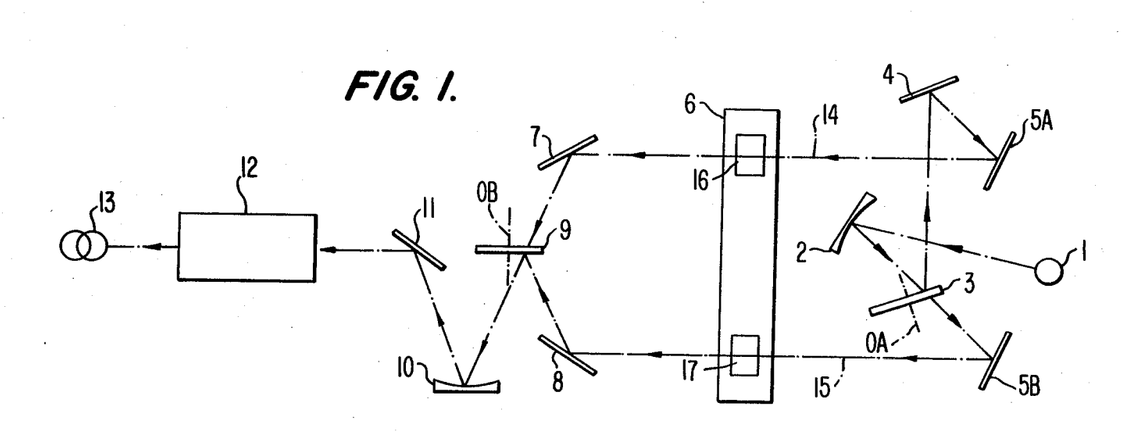
FIG. 1 is a block diagram of an optical system employed in the spectrophotometer of the present invention.
Figure 2:
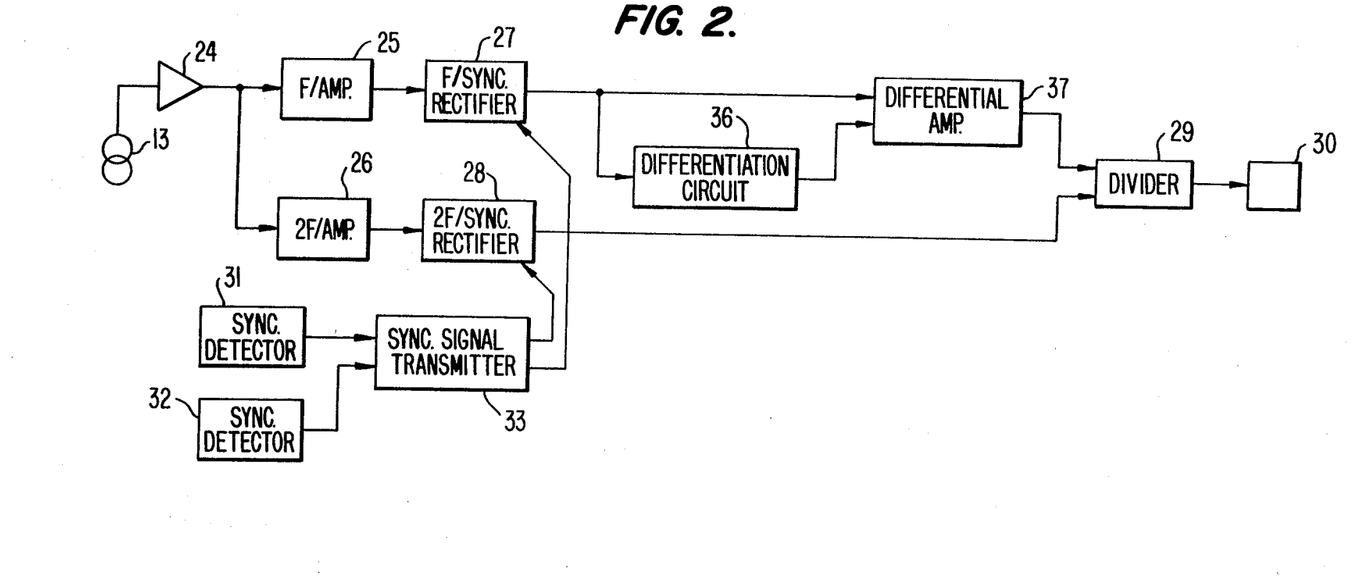
FIG. 2 is a block diagram of an electrical processing system employed in the spectrophotometer.

One preferred embodiment of the double-beam spectrophotometer according to the present invention will be described with reference to FIGS. 1 to 7. Referring to FIGS. 1 and 2, there are illustrated in block diagram an optical system and an electrical processing system involved in the spectrophotometer of the present invention. First, the optical system of the spectrophotometer of the present invention will be described in detail.

Referring to FIG. 1, a source 1 of infrared radiation in the form of a globar lamp or Nernst lamp emits a beam of infrared radiation toward a concave mirror 2 by which the beam is reflected to enter a first rotary sector 3 where the beam is alternately divided or distributed between two beam paths. The first sector 3 has reflective and transparent regions arranged in a particular pattern as will be described later. The light beam reflected by the first sector 3 is reflected by plane mirrors 4 and 5A to travel along a reference beam path 14 to form a reference beam, whereas the transmitted light beam from the first sector is reflected by a plane mirror 5B to travel along a sample beam path 15 to form a sample beam. The beams travelling along the reference and sample beam paths 14 and 15 enter reference and sample cells 16 and 17 supported in a cell holder 6 and aligned with the reference and sample beam paths, respectively, and are then reflected by plane mirrors 7 and 8. A second sector 9 is positioned substantially at the crossing of the thus deflected beam paths. The reference and sample beams enter the second sector 9 where they are guided into a common beam path. More specifically, the second sector 9 also has reflective and transparent regions arranged in a particular pattern as will be described later in detail. The reference beam passing through the second sector 9 and the sample beam reflected by the second sector 9 alternately appear in the common beam path. The light beam from the second sector 9 is focused to an incident slit of a monochromator 12 through a concave mirror 10 and a plane mirror 11. The light beam is spectrally isolated by the monochromator 12 into monochromatic light which in turn, enters a detector 13 in the form of a thermocouple where it is converted into an electrical signal.

The first and second sectors 3 and 9 are rotated about their axes OA and OB perpendicular to their major surface by drive means such as a motor (not shown), and incident light impinges on each sector at a point off the center.

Figure 3:
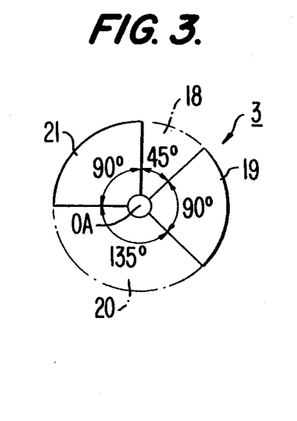
FIGS. 3 and 4 are schematic views of the first and second sectors used in one preferred embodiment of the invention, respectively.

The first sector 3 is in the form of a phantom disc which consists of, for example, as shown in FIG. 3, a first sectoral transparent or cut-out region 18 having a central angle of 45 degrees with respect to the axis of rotation OA and allowing incident light to pass therethrough, a second sectoral reflective or mirror region 19 having a central angle of 90 degrees and reflecting incident light, a third sectoral transparent or cut-out region 20 having a central angle of 135 degrees and allowing incident light to pass therethrough, and a fourth sectoral reflective or mirror region 21 having a central angle of 90 degrees and reflecting incident light, the first to fourth sectoral regions being circumferentially arranged about the axis of rotation OA in this order.

Figure 4:
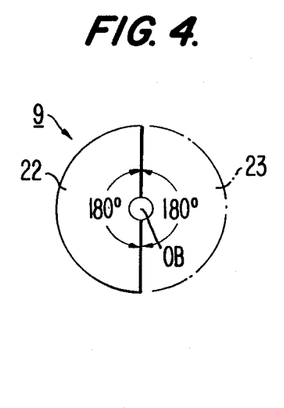

The second sector 9 is in the form of a phantom disc which consist of, for example, as shown in FIG. 4, a semicircular reflective or mirror region 22 having a central angle of 180 degrees with respect to the axis of rotation OB and reflecting incident light, and another semi-circular transparent or cut-out region 23 having a central angle of 180 degrees and allowing incident light to pass therethrough.

Figure 5:
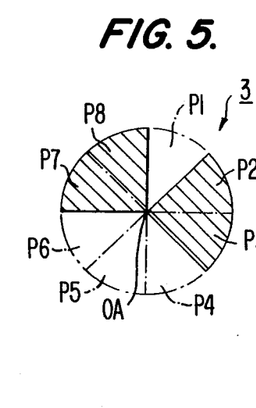
FIGS. 5 and 6 are equivalent representations of transparent and reflective regions of the first and second sectors, helpful to identify output signals of the detector.
Figure 6:
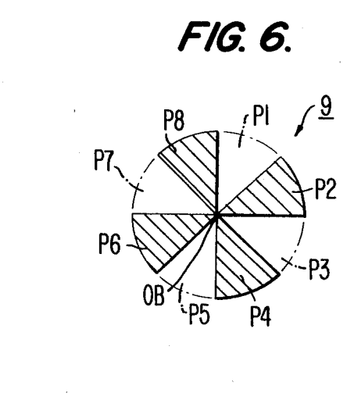
Figure 7:
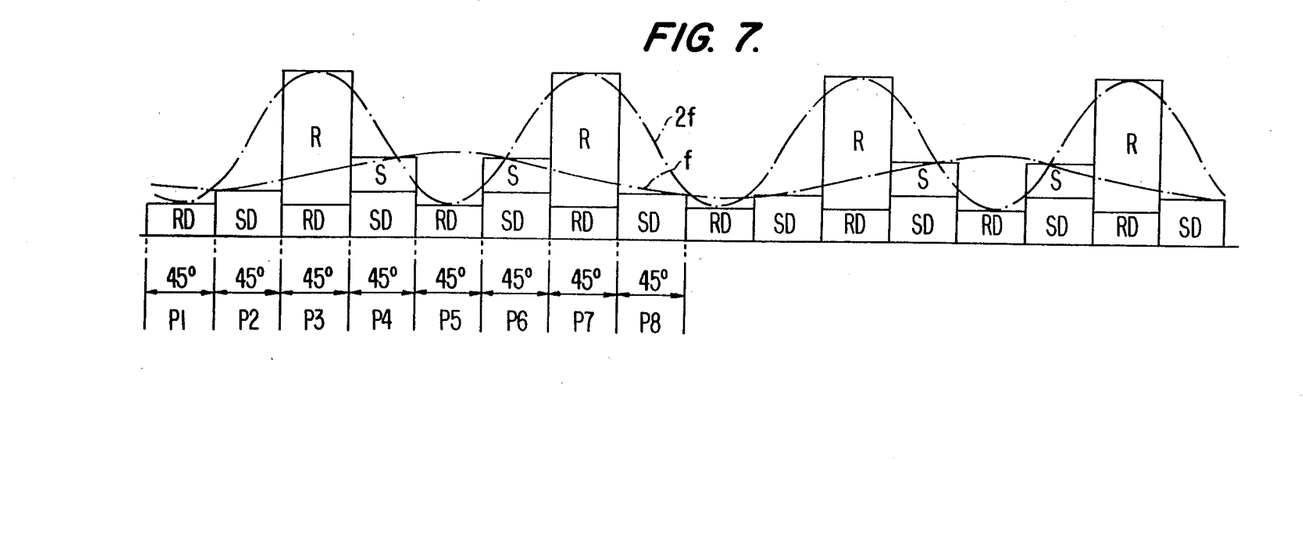
FIG. 7 is a diagram showing output signals of the detector.

In carrying out analytical measurement using the above-described optical system, the reference cell 16 may be filled with a reference material or kept empty and the sample cell 17 is filled with a sample to be analyzed. The first and second sectors 3 and 9 are synchronously rotated at a speed ratio of 1:4. More specifically, the first transparent region 18 of the first sector 3 is first positioned in register with the transparent region 23 of the second sector 9, and the second sector 9 makes four revolutions while the first sector 3 makes one revolution. For one revolution of the first sector 3, the sequence of transmission and reflection provided by the first and second sectors 3 and 9 can be shown as equivalent representations in FIGS. 5 and 6. Consequently, the detector 13 develops sequential signals as shown in FIG. 7. In FIGS. 5 and 6, blank regions represent transmission and hatched regions represent reflection.

The signals sequentially developed by the detector 13 as shown in FIG. 7 will be described in more detail. As understood from FIGS. 5 and 6, eight signals are sequentially developed with a phase difference of 45 degrees during one revolution of the first sector 3. In a first 45° zone P1, the light beam from the source 1 passes through the first sector 3 to form a sample beam (15). At this point, the second sector 9 presents a transparent region so that the sample beam (15) cannot reach the monochromator 12 while dark light from the reference cell 16, which does not receive a light beam from the source, enters the monochromator 12 which develops a signal representative of reference dark RD. The reference dark RD consists essentially of undesirable radiant light from the reference material in the reference cell 16. In a second 45° zone P2, the light beam from the source 1 is reflected by the first sector 3 to from a reference beam (14). At this point, the second sector 9 presents a reflective region so that the reference beam (14) cannot reach the monochromator 12 while dark light from the sample cell 17, which does not receive a light beam from the source, enters the monochromator 12 which develops a signal representative of sample dark SD. The sample dark SD consists essentially of undesirable radiant light from the sample in the sample cell 17. In a third 45° zone P3, the light beam from the source 1 is reflected by the first sector 3 to form a reference beam (14). At this point, the second sector 9 presents a transparent region so that the reference beam (14) along with reference dark radiation enters the monochromator 12 which develops a signal representative of reference R plus reference dark RD. In a fourth 45° zone P4, the light beam from the source 1 passes through the first sector 3 to form a sample beam (15). At this point, the second sector 9 presents a reflective region so that the sample beam (15) along with sample dark radiation enters the monochromator 12 which develops a signal representative of sample S plus sample dark SD. Thereafter, in the following zones P5, P6, P7, and P8, signals representative of RD, S+SD, R+RD, and SD are sequentially developed as shown in FIG. 7, totalling to eight signals in one cycle. It should be noted that for convenience of description, the intensity of the beam transmitted by the reference material or cell is referred to as reference R, the intensity of the beam transmitted by the sample material or cell is referred to as sample S, the intensity of dark radiant light from the reference material or cell itself is referred to as reference dark RD, and the intensity of dark radiant light from the sample material or cell itself is referred to as sample dark SD.

Provided that the first sector 3 is rotated at a frequency f and the second secter 9 is rotated at a frequency 4f, the detector 13 develops f sets of the eight signals mentioned above per unit time. During operation of the optical system, the output of the detector 13 involves a signal having the frequency 2f corresponding to reference R and a signal having the frequency f corresponding to sample S as seen from waveforms interconnected by dot-and-dash curves in FIG. 7. It will be understood that the signal at frequency 2f has an amplitude of R=(R+RD)−RD and the signal at frequency f has an amplitude of S=(S+SD)−SD, which means that the dark components corresponding to undesired radiant light from the reference and sample materials themselves are removed.

Next, the electrical processing system for computing the S/R ratio, that is, the percent transmission of the sample material on the basis of outputs of the detector mentioned above will be described with reference to FIG. 2.

The electrical processing system connected to the detector 13 includes a pre-amplifier 24 for amplifying the output signal of the detector 13, and a first filter amplifier 25 connected to the pre-amplifier 24 for amplifying that component of the signal which corresponds to frequency f, and a second filter/amplifier 26 also connected to the pre-amplifier 24 for amplifying that component of the signal which corresponds to frequency 2f, whereby the components having frequencies f and 2f are independently amplified. The outputs of the first and second amplifiers 25 and 26 are synchronously rectified by first and second synchronous rectifiers 27 and 28 set to frequencies f and 2f, respectively. The synchronous rectifiers 27 and 28 set to frequencies f and 2f receive sync signals from synchronuous detectors 31 and 32 associated with the first and second sectors 3 and 9 via a common sync signal transmitter 33. The synchronous detectors may be any desired one of well known type, for example, photocouplers and the detailed description and illustration are omitted.

Since the rectified f-component output of the first synchronous rectifier 27 corresponds to sample S, that is, the intensity of light transmitted by the sample free of sample dark (SD) and the rectified 2f-component output of the second synchronous rectifier 28 corresponds to reference R, that is, the intensity of light transmitted by the reference cell free of reference dark (RD), it is believed possible to obtain the S/R ratio free of a false signal component resulting from undesired radiant light by determining the ratio of the outputs of the synchronous rectifiers 27 and 28. However, as mentioned in the preamble, during wavelength scanning in the wavelength region where the absorption by atmospheric $H_2O$ and $CO_2$ is of significant magnitude, the absorption rapidly changes due to $H_2O$ and $CO_2$ and hence, the incident energy to the photodetector rapidly changes to deform the output waveform of the photodetector, resulting in phase deviations. Since the filters built in the amplifiers 25 and 26 for frequency discrimination have sensitive phase characteristics, noises are contained in outputs of the filters. For example, the output of the first amplifier 25, which also serves as a f-component filter, is a sinusoidal wave signal of frequency f corresponding to the sample beam intensity S. In a wavelength region where the absorption by $CO_2$ and $H_2O$ is significant, a concomitant rapid change in the incident energy results in a phase deviation which causes the sinusoidal waveform $S_f$ of the output of the first amplifier 25 to be attenuated as diagramatically shown in FIG. 8, producing noise. It would be understood that the energy change corresponds to the gradient of a line 1 connecting peaks of the attenuated waveform shown in FIG. 8. Since this gradient corresponds to a change of the signal obtained by synchronously rectifying the output of the first amplifier 25, that is, a change of the output of the first synchronous rectifier 27, a differential of the output of the first synchronous rectifier 27 corresponds to the above-described energy change. Consequently, the noise concomitant with the energy change is eliminated by subtracting from the output of the first synchronous rectifier 27 a differential thereof.

The noise resulting from the energy change caused by rapid absorption changes due to $CO_2$ and $H_2$ will be introduced in both the component having frequency f corresponding the sample beam intensity and the component having frequency 2f corresponding to the reference beam intensity. Since the 2f-component has a frequency twice as high as the f-component, the former can follow the energy change better than the latter and is thus less affected by the absorption by $CO_2$ and $H_2$. For this reason, only the component having fundamental frequncy f is taken into account in the present invention.

The embodiment illustrated in FIG. 2 uses a differentiation circuit 36 connected to the output terminal of the f-component synchronous rectifier 27 and a differential amplifier 37 connected to the output terminals of the f-component synchronous rectifier 27 and the differentiation circuit 36, whereby the output of the differentiation circuit 36 is subtracted from the output of the f-component synchronous rectifier 27 to give a difference. The output of the differential amplifier 37 indicative of the difference, that is, a signal having a level corresponding to the sample beam intensity S and having eliminated the influence of a rapid change of energy is supplied to one input terminal of computing means in the form of a divider 29. On the other hand, the output of the 2f-component synchronous rectifier 28, that is, a signal having a level corresponding to the reference beam intensity R is directly supplied to another input terminal of the divider 29 where the ratio of these signals, that is, S/R ratio is computed. The S/R ratio is numerically indicated on a recorder 30. The influence of noise due to absorption by $CO_2$ and $H_2O$ has been essentially eliminated from the S/R ratio thus obtained.

Although the second sector 9 is provided with a reflective surface on the side on which the light beam along the sample beam path 15 is incident in the embodiment shown in FIG. 1, inversely, the second sector may be provided with a reflective surface on the side on which the light beam along the reference beam path 14 is incident and the concave mirror 10 and the plane mirror 11 may be re-arranged such that the monochromator 12 may receive reflected light from the reference beam path and transmitted light from the sample beam path. In this case, however, inversely to the order shown in FIG. 6, the phase of rotation of the second sector 9 must be controlled such that regions P1, P3, P5, and P7 are reflective regions and regions P2, P4, P6, and P8 are transparent regions.

It is only required for the first sector 3 that regions P1 and P5 do not substantially allow the light beam from the source to enter the reference beam path. Instead of making regions P1 and P5 transparent as shown in FIG. 5, these regions P1 and P5 may be a non-reflective screening region which does not allow the beam from the source to be transmitted to the sample beam path or substantially reflected to the reference beam path. Also, it is only required for the first sector 3 that regions P2 and P8 do not allow the light beam from the source to enter the sample beam path. Instead of making regions P2 and P8 reflective as shown in FIG. 5, these regions P2 and P8 may be a non-reflective screening region which does not allow the beam from the source to be transmitted to the sample beam path or substantially reflected to the reference beam path. In these cases, the detector produces the same outputs as shown in FIG. 7.

Figures 8, 9:
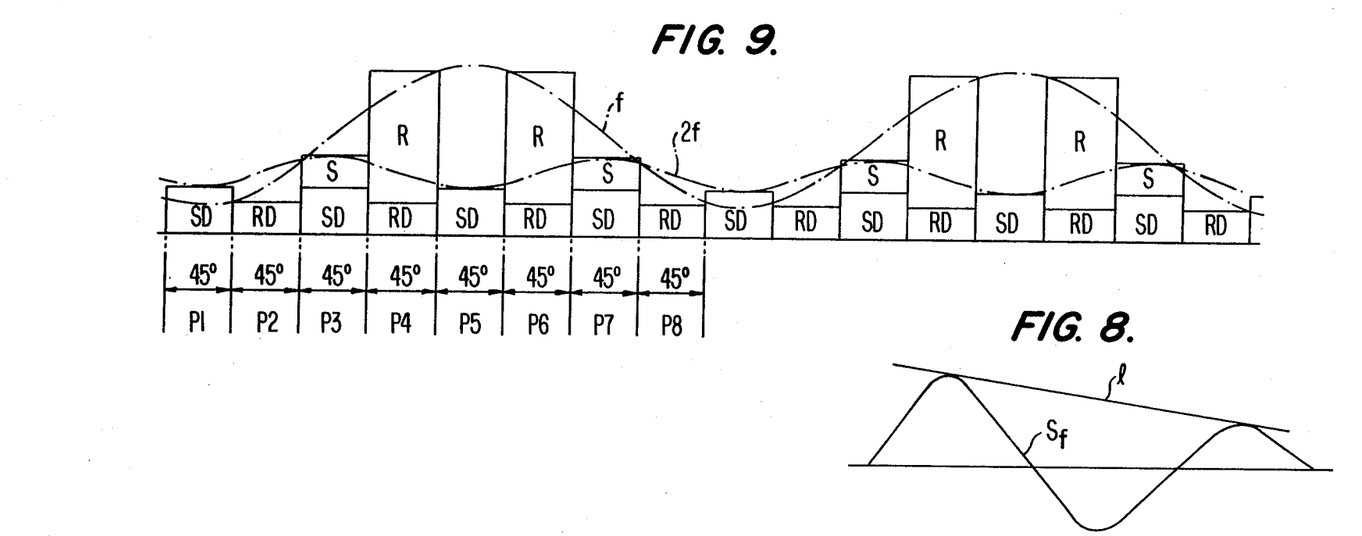
FIG. 8 shows the waveform of an output of the first amplifier serving as an f-component filter in the circuit shown in FIG. 2.
FIG. 9 is a diagram showing output signals of the detector in another preferred embodiment.

Next, another preferred embodiment of the spectrophotometer according to the present invention will be described. Although the reference and sample beam paths 14 and 15 are drawn on the upper and lower sides in the first embodiment shown in FIG. 1, the beam paths may be replaced with each other, that is, the reference and sample cells 16 and 17 may be replaced with each other, for example, by rotating the cell holder 6 an angle of 180 degrees. In this case, however, output signal of the detector 13 contain reference and sample components in the inverse order to those signals in the first embodiment. There are developed eight signals of SD, RD, S+SD, R+RD, SD, R+RD, S +SD, and RD in this order with a phase difference of 45° in one cycle as shown in FIG. 9. As seen from FIG. 9, the curve having frequency f corresponds to reference R and the curve having frequency 2f corresponds to sample S. Therefore, in this embodiment, the S/R ratio is obtained by using the differentiation circuit 36 where the output of the f-component sync rectifier 27 corresponding to the reference beam intensity is differentiated, the differential amplifier 37 where the resultant differential is subtracted from the output of the f-component sync rectifier 27, and the divider 29 where the output of the 2f-component sync rectifier 28 corresponding to the sample beam intensity is divided by the output of the differential amplifier 37.

Figure 10:
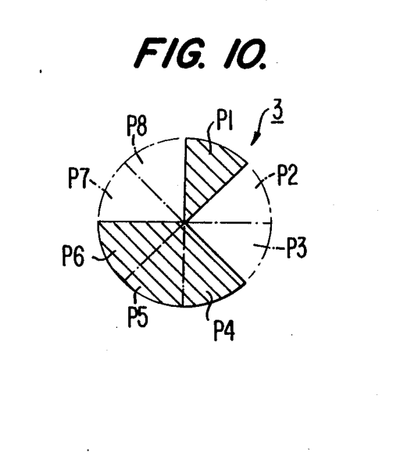
FIGS. 10 and 11 are equivalent representations of transparent and reflective regions of the first and second sectors which are arranged to produce output signals as shown in FIG. 9.
Figure 11:
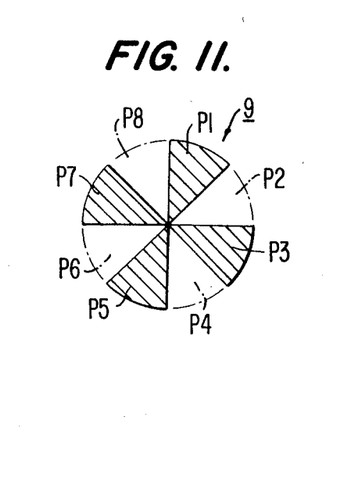

It should be understood that replacing the reference and sample beam paths 14 and 15 with each other is equivalent to replacing the transparent and reflective regions of the first sector 3 with each other with the arrangement of the beam paths 14 and 15 in FIG. 1 unchanged, and at the same time, replacing the transparent and reflective regions of the second sector 9 with each other. In the latter case, regions P1, P4, P5, and P6 of the first sector 3 are made reflective regions which reflect the beam from the source to the reference path 14, and regions P2, P3, P7, and P8 are made transparent regions which transmit the beam from the source to the sample beam path 15 as shown in FIG. 10. Regions P1, P3, P5, and P7 of the second sector 9 are made reflective regions which reflect the beam along the sample beam path 15 to the monochromator, and regions P2, P4, P6, and P8 are made transparent regions which transmit the beam along the reference beam path 14 to the monochromator as shown in FIG. 11. Furthermore, regions P1 and P5 of the first sector 3 may be non-reflective screening regions as they are only required not to allow the beam from the source to enter the sample beam path 15. Similarly, regions P2 and P8 of the first sector 3 may be non-reflective screening regions as they are only required not to allow the beam from the source to enter the reference beam path 14.

Figure 12:
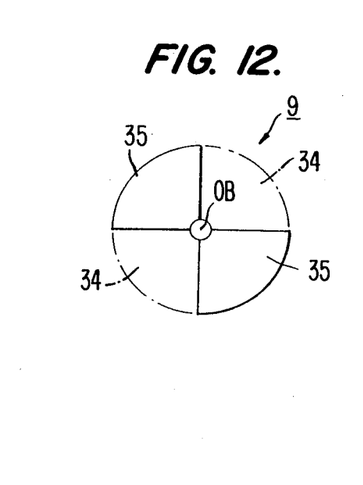
FIG. 12 is a schematic view of the second sector in a further preferred embodiment.
Figure 13:
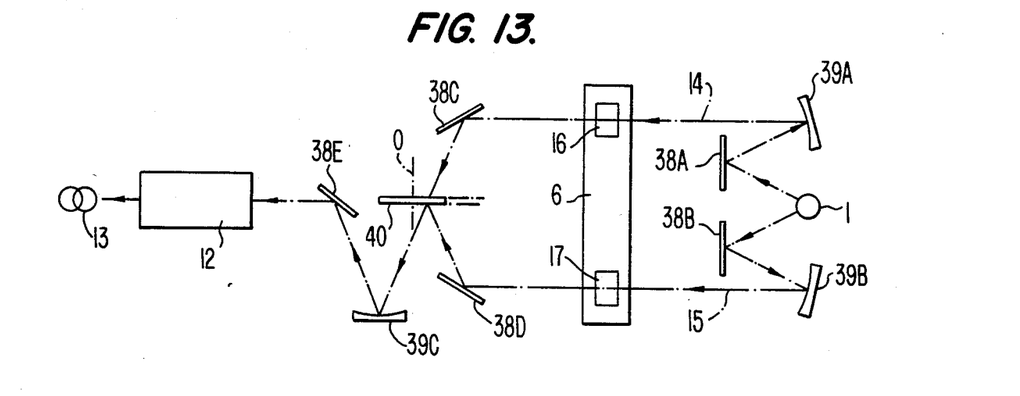
FIG. 13 is a schematic illustration of one optical system of the spectrophotometer according to a further preferred embodiment of the present invention.

In the above embodiments, the second sector 9 is used which consists of a semi-circular transparent region and the remaining semi-circular reflective region, although the configuration of the second sector is not limited thereto. For example, as shown in FIG. 12, the second sector 9 may consist of two opposed transparent regions 34 and two opposed reflective regions 35 all having a central angle of 90° with respect to the central axis. Since the sector consists of four quadrants rather than two semi-circles in this case, the ratio of rotation speed of the first sector to the second sector should be 1:2 rather than 1:4 in order to obtain the output signals shown in FIG. 7 from the detector. Furthermore, the second sector 9 may be a disc having transparent regions and reflective regions arranged about the central axis, each region having an equal central angle of 45 degrees. In this case, the first and second sectors 3 and 9 may be rotated at a speed ratio of 1:1. If the reference cell and the sample cell are replaced with each other, there are obtained the output signals shown in FIG. 9 from the detector as described previously. FIG. 13 illustrates the optical system of a further preferred embodiment of the spectrophotometer according to the present invention.

Referring to FIG. 13, a radiation source 1 emits light which is concurrently guided along reference and sample beam paths 14 and 15 via plane mirrors 38A, 38B and concave mirrors 39A, 39B to pass through a reference cell 16 filled with a standard material in the reference beam path 14 and a sample cell 17 filled with a sample in the sample beam path 15. The light transmitted by the reference cell 16 forms a reference beam and the light transmitted by the sample cell 17 forms a sample beam. The reference and sample beams are then guided by plane mirrors 38C, 38D to a sector mirror 40 functioning as beam path switching means where they are cyclically interrupted and switched. The selected one of the reference and sample beams is then guided by a concave mirror 39C and a plane mirror 38E to enter a monochromator 12 where it is spectrally isolated into monochromatic light which in turn, enters a photodetector 13, more particularly, a thermal infrared detector such as a thermocouple.

Figure 14:
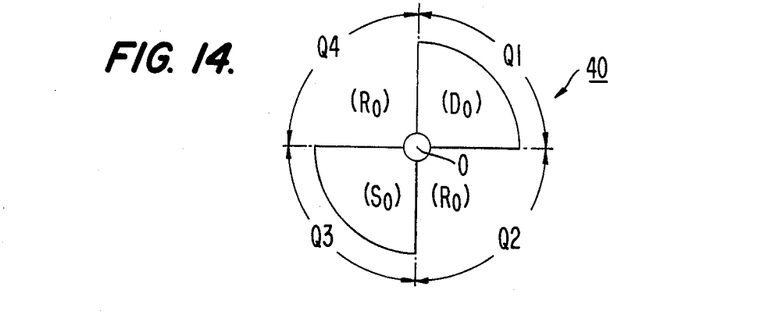
FIG. 14 is a schematic view of a sector mirror used as beam path switching means in the spectrophotometer shown in FIG. 13.

The sector mirror 40 is coupled to drive means (not shown), for example, a synchronous motor, so as to rotate about its central axis of rotation O extending perpendicular to the plane of the mirror. The sector mirror 40 is located to transverse the crossing of the reference and sample beams such that the reference and sample beams are incident on it at a point radially spaced from its axis of rotation O at an equal incident angle $\theta$ of less than 90 degrees, but from its opposite sides as shown in FIG. 13. The sector mirror 40 is sectioned into four quadrants or arcs Q1, Q2, Q3, and Q4 of 90 degrees with respect to its axis of rotation O as shown in FIG. 14. The first quadrant Q1 is a region which provides a dark state interrupting both the reference and sample beams, and in the illustrated embodiment, is formed as a non-reflective wall capable of preventing transmittance of the reference beam and reflection of the sample beam. The second quadrant Q2 is a region which provides a first reference beam selecting state allowing only the reference beam to advance, and in the illustrated embodiment, is formed as a cut-out or space which transmits the reference beam, but does not reflect the sample beam. The third quadrant Q3 is a region which provides a sample beam selecting state allowing only the sample beam to advance, and in the illustrated embodiment, is formed as a mirror region which reflects the sample beam, but does not transmit the reference beam. Finally, the fourth quadrant Q4 is a region which provides a second reference beam selecting state allowing only the reference beam to advance again, and in the illustrated embodiment, is formed as a cut-out or space as is the second quadrant Q2.

Figure 15:
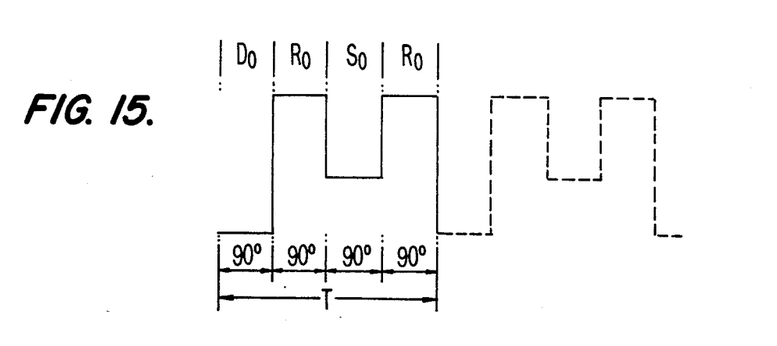
FIG. 15 is a waveform chart showing the sequence of beam path switching and interruption in the optical system shown in FIG. 13.

Upon rotation of the sector mirror 40, the photodetector 13 alternately receives a reference beam $R_0$ and a sample beam $S_0$ through the monochromator 12 at time intervals shown in FIG. 15. More specifically, assuming that the dark state ($D_0$) starts at 0°, the dark state ($D_0$) continues for a quarter or 90° of revolution. The sector mirror is then switched to the first reference beam selecting state where the reference beam $R_0$ continues to enter the detector for a second quarter or 90° of revolution; thereafter to the sample beam selecting state where the sample beam $S_0$ continues to enter the detector for a third quarter or 90° of revolution; and finally to the second reference beam selecting state where the reference beam $R_0$ continues to enter the detector again for a fourth quarter or 90° of revolution. In this way, four states of dark $D_0$, reference beam $R_0$, sample beam $S_0$, and reference beam $R_0$ are repeated as one cycle having a time T. It would be readily understood that if the reference beam path 14 and the sample beam path 15 are exchanged with each other in FIG. 13, then the sector mirror 40 of FIG. 14 may be modified such that the reference beam selecting quadrants Q2 and Q4 are mirrors and the sample beam selecting quadrant Q3 is a cut-out. In this case, each cycle consists of four states $D_0$, $R_0$, $S_0$ and $R_0$ at the same time intervals as shown in FIG. 15.

Figure 16:
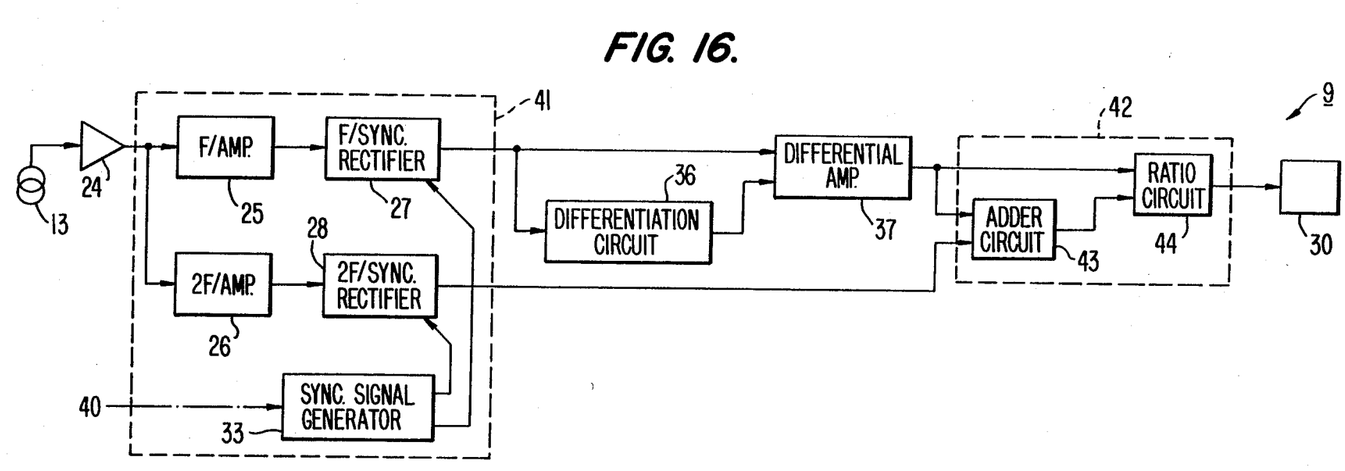
FIG. 16 is a block diagram showing one example of the signal processing means of the spectrophotometer according to the present invention.

FIG. 16 is a block diagram showing one embodiment of electrical signal processing means of the spectrophotometer according to the present invention which is electrically connected to the detector 13 in FIG. 13.

The signal processing means comprises a signal component separating circuit and an arithmetic circuit generally designated at 41 and 42, respectively, in FIG. 16. The signal component separating circuit 41 receives a signal from the detector 13 in the form of a thermocouple through a pre-amplifier 24. This signal component separating circuit 41 serves to separately take out of the input signal a component having a fundamental frequency corresponding to one cycle of the above-mentioned beam path switching means, that is, a component having a fundamental frequency $f = 1/T$ where one cycle consisting of the four states switched by the sector mirror 40 continues for a period of T second (to be referred to as f-component, hereinafter), and a component having a double frequency 2f which is twice the fundamental frequency f (to be referred to as 2f-component, hereinafter). More specifically, the signal component separating circuit 41 consists of a first filter/amplifier 25 allowing the f-component to pass, a second filter/amplifier 26 allowing the 2f-component to pass, a sinc signal generator 33 which coordinates with the sector mirror 40 to generate sinc signals, and f- and 2f-component synchronous rectifier circuits 27 and 28 for synchronously rectifying signals from the first and second amplifiers 25 and 26 in synchronism with the sinc signals to thereby produce DC signals corresponding to f- and 2f-components, respectively. The f-component output signal taken out of the f-component synchronous rectifier 27 is supplied to a differentiation circuit 36 where it is differentiated, and the differential output is supplied along with the output of the f-component synchronous rectifier 27 to a differential amplifier 37 where the differential output is subtracted from the output of the rectifier 27. The output signal of this differential amplifier 37 and the output signal of the 2f- component synchronous rectifier circuit 28 are supplied to an arithmetic circuit 42 for computation. More specifically, the arithmetic circuit 42 consists of an adder circuit 43 for adding the input signals, and a ratio circuit 44 for determining the ratio of an output signal of the adder circuit 43 to the output signal of the differential amplifier 37.

The operation of the above-mentioned signal processing means will be further described in conjunction with the operation of the sector mirror 40.

Figure 17:
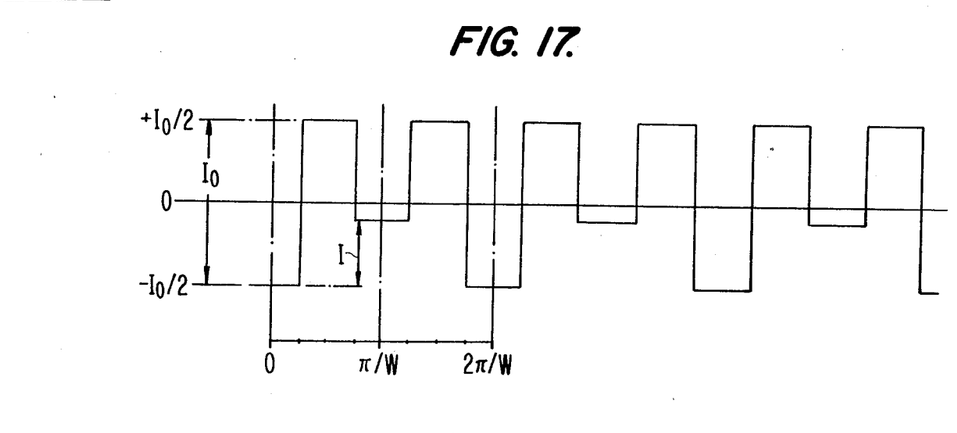
FIG. 17 is a diagram showing a waveform used in the Fourier expansion of an output waveform of the preamplifier in the circuit of FIG. 16, and FIG. 18 schematically shows another example of the optical system of the spectrophotometer to which the present invention is applicable.

The pre-amplifier 24 develops a signal whose waveform f(t) is diagramatically shown in FIG. 17. Of course, the actual waveform is more dull than that shown in FIG. 17 due to the time constant of the detector or the like. In FIG. 17, $I_0$ represents the intensity of a reference beam, I represents the intensity of a sample beam, and $\omega$ represents the angular velocity of the sector mirror.

The Fourier expansion of the waveform f(t) shown in FIG. 17 is carried out to determine a fundamental wave A(1) and a second harmonic wave A(2) under the assumption that a portion $(0, 2\pi/\omega)$ is cyclically connected. The fundamental wave A(1) or component A(1) having the fundamental frequency f is given by:

$$A(1) = \sqrt{2}\, I/\pi \quad (1)$$

The second harmonic wave A(2) or component having the double frequency 2f is given by:

$$A(2) = (2I_0 - I)/\pi \quad (2)$$

It is apparent from equation (1) that the component having fundamental frequency f (or output of the f-component synchronous rectifier circuit 27) is proportional to the sample beam intensity I. It is also apparent from equation (2) that the component having double frequency 2f (or output of the 2f-component synchronous rectifier circuit 28) is proportional to the double of the reference beam intensity $I_0$ minus the sample beam intensity I. Then, a signal proportional to the reference beam intensity $I_0$ is obtained by adding f-component A(1) to 2f-component A(2) after coefficient adjustment. This coefficient adjustment may be readily achieved by carrying out gain control intermediate the signal processing routes. For example, the component A(1) having fundamental frequency f is multiplied by $1/\sqrt{2}$ before it is added to the component A(2) having double frequency 2f as shown by the following equation:

$$A(1) \times 1/\sqrt{2} + A(2) = 2I_0/\pi \quad (3)$$

This means that there is produced a signal representative of $I_0$ multiplied by a constant $2/\pi$, that is, a signal proportional to $I_0$.

Since the output of the f-component synchronous rectifier circuit 27 contains noises caused by rapid absorption changes due to $CO_2$ and $H_2O$ as described previously, this embodiment is also designed like the previous embodiment such that the output of the f-component synchronous rectifier circuit 27 is differentiated in the differentiation circuit 36, and the output of the differentiation circuit 36 is subtracted from the output of the f-component synchronous rectifier circuit 27 in the differential amplifier 37, which produces a f-component signal (corresponding to the sample beam intensity I) free of noise resulting from rapid absorption changes due to $CO_2$ and $H_2O$. The output of the differential amplifier 37 is added to the output of the 2f-component synchronous rectifier circuit 28 in the adder circuit 43, which produces a signal corresponding to the reference beam intensity $I_0$ as described previously.

A signal which is output by the adder circuit 43 and proportional to the reference beam intensity $I_0$ and another signal which is output by the differential amplifier 37 and proportional to the sample beam intensity I are fed to the ratio circuit 44, which produces a signal corresponding to the ratio $I/I_0$ of the sample beam intensity I to the reference beam intensity $I_0$. That is, the ratio circuit 44 develops an output corresponding to the transmittance (or reciprocal of absorbance) of a sample and substantially free of the influence of a rapid absorption change due to $CO_2$ and $H_2O$ and this output is recorded by a recorder 30.

Figure 18:
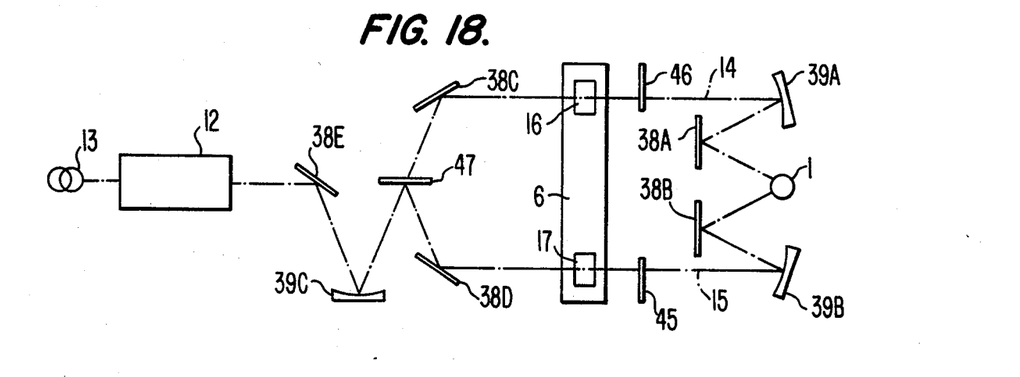

FIG. 18 illustrates one example of the optical system of the ratio-type double-beam infrared spectrophotometer to which the present invention is applicable.

In the optical system shown in FIG. 18, the light beam from a light source 1 is continuously and concurrently guided to both reference and sample beam paths 14 and 15. Choppers 45 and 46 are inserted in the sample and reference beam paths 15 and 14, respectively. The light beams along the reference and sample beam paths 14 and 15 are thus alternately guided to a common beam path through a half mirror 47, and then to a photodetector 13 through a monochromator 13. The half mirror 47 is formed of a material having equal reflectance and transmittance.

The chopper 45 in the sample beam path 15 rotates at a frequency f to interrupt the sample beam at this frequency. The chopper 46 in the reference beam path 14 rotates at a frequency integral times as high as the frequency f, for example, at a frequency 2f to interrupt the reference beam at the frequency 2f.

Also in this optical system, although errors due to undesired radiant light from the sample itself at certain temperatures are not eliminated, the output signal of the photodetector 13 contains a component of frequency f corresponding to the sample beam intensity and another component of frequency 2f corresponding to the reference beam intensity as in the embodiment shown in FIG. 1. The S/R ratio may thus be obtained using signal processing means as shown in FIG. 2 More specifically, by differentiating the output of the f-component synchronous rectifier 27 in the differentiation circuit 36 from the output of the f-component synchronous rectifier 27 in the differential amplifier 37, the S/R ratio is obtained which contains minimal error because of substantial elimination of the influence of rapid changes in spectral absorption due to the presence of $H_2O$ and $CO_2$.

When the signal processing means shown in FIG. 2 is applied to the optical system shown in FIG. 18, the synchronous detector 31 detects the interruption of the sample beam (15) by the first chopper 45 and the synchronous detector 32 detects the interruption of the reference beam (14) by the second chopper 46, and the sync signal transmitter 33 transmits sync signals in coordination with the choppers 45 and 46.

In the optical system shown in FIG. 18, it is possible to interrupt the reference beam (14) at frequency f by means of the chopper 46 and to interrupt the sample beam (15) at frequency 2f by means of the chopper 45. In this case, the 2f-component in the output signal of the photodetector 13 corresponds to the sample beam intensity and the f-component corresponds to the reference beam intensity. In the optical system shown in FIG. 18, it is also possible that the interrupting frequency associated with one beam path is integral times, for example, three or more times as high as the interrupting frequency assiciated with the other beam path. In this case, the second synchronous rectifier 28 is, of course, set to a frequency corresponding to the interrupting frequency associated with the other beam path.

As described above, the spectrophtometer of the present invention based on the frequency component detection system is organized such that a change in the incident energy is detected by means of a differentiation circuit, and the resulting differential is subtracted from a signal component of fundamental frequency obtained after frequency discrimination and synchronous rectifying, thereby compensating for phase deviations to eliminate errors. The following advantages are thus available.

First of all, the use of the frequency component isolation system eliminates the disadvantages of the optical null balance system. The foremer system does not undergo a loss of measurement accuracy resulting from the machining accuracy of an optical attenuator, rotational fluctuations in driving of the attenuator, and errors in the linearity of a potentiometer for detecting the position of the attenuator. Further, the use of the electrical direct ratio system eliminates the need for a serve loop system, allowing simple signal handling process and circuitry to be employed.

Secondly, since phase deviations caused by rapid changes of spectral absorption due to the presence of $H_2O$ and $CO_2$ in the beam paths are compensated for, the invention minimizes the occurrence of noises due to phase deviations which the prior art frequency component detection systems have suffered from. Although the noise originating from phase deviations caused by changes of incident energy occupies about 10% of the output in the prior art systems, the present invention has succeeded in reducing the proportion of noise in the output to about 1 percent. Therefore, the spectrum which has been obscured in the absorption by $H_2O$ and $CO_2$ can now be identified.

Thirdly, since the above-mentioned phase deviations are compensated for by electrical processing, it is unnecessary to slow down the feed speed of the recorder in a region where spectral absorption changes rapidly, eliminating the disadvantages that scanning throughout the entire wave number range takes a long time and that a complicated compensation system is required. As a result, there is obtained a spectrophotometer of the frequency component detection system whose output is substantially free of noise even when scanning is made within 2 minutes over the wave number range of from 4000 to 400 $cm^{-1}$.

What we claimed is:

1. A ratio type double-beam spectrophotometer comprising
    a light source for emitting a beam of light,
    a monochromator,
    an optical system, including reference and sample beam paths, for distributing the beam from the source between the reference and sample beam paths to form reference and sample beams and for guiding the reference and sample beams along a common beam path toward said monochromator,
    a reference cell inserted in the reference beam path,
    a sample cell inserted in the sample beam path,
    a photodetector located downstream of said monochromator for detecting the intensity of monochromatic light from said monochromator, and
    signal processing means electrically connected to said photodetector for processing an output signal of said detector,
    wherein said optical system is constructed such that the output signal of said photodetector is a composite signal in which a first frequency component correlated to at least one of the intensity of the light beam transmitted by the sample cell (to be referred to as sample beam intensity) and the intensity of the light beam transmitted by the reference cell (to be referred to as reference beam intensity) is combined with a second frequency component correlated to at least the other of the sample beam intensity and the reference beam intensity and corresponding to a frequency integral times as high as the frequency of the first frequency component, said signal processing means includes
        discriminator means for discriminating the output signal of said photodetector into said first frequency component and said second frequency component,
        a first synchronous rectifier connected to said discriminator means for synchronously rectifying the first frequency component therefrom,
        a second synchronous rectifier connected to said discriminator means for synchronously rectifying the second frequency component therefrom, and
        computing means for computing the outputs of said first and second synchronous rectifiers to yield the ratio of the sample beam intensity to the reference beam intensity,
    the improvement comprising
    a differentiation circuit connected to said first synchronous rectifier for differentiating the output signal thereof, and
    subtraction means connected to said first synchronous rectifier and said differentiation circuit for subtracting the output of said differentiation circuit from the output of said first rectifier,
    wherein said computing means is connected to said first synchronous rectifier through said differentiation circuit and said subtraction means while it is directly connected to said second synchronous rectifier.

2. The spectrophotometer according to claim 1 wherein said optical system includes
    a first sector for distributing the light beam from said light source between the reference and sample beam paths to form reference and sample beams, respectively, and
    a second sector for guiding the reference and sample beams into the common beam path toward the monochromator,
    wherein said first and second sectors are coordinated such that said detector receives from said monochromator the following eight light inputs (a) to (h):
    (a) radiant light from the reference cell which does not receive the light beam from the source,
    (b) radiant light from the sample cell which does not receive the light beam from the source,
    (c) the light beam transmitted by the reference cell which receives the light beam from the source, (d) the light beam transmitted by the sample cell which receives the light beam from the source, (e) radiant light from the reference cell which does not receive the light beam from the source, (f) the light beam transmitted by the sample cell which receives the light beam from the source, (g) the light beam transmitted by the reference cell which receives the light beam from the source, and (h) radiant light from the sample cell which does not receive the light beam from the source, in this sequence with a phase difference of 45 degrees in one cycle, and wherein said first frequency component in the output signal of the photodetector is a frequency component having a frequency in accord with said cycle and corresponding to said sample beam intensity, and said second frequency component is a frequency component having a frequency twice the frequency of said first frequency component and corresponding to the reference beam intensity, and said computing means functions to determine the ratio of the output of said subtraction means to the output of said second synchronous rectifier.

3. The spectrophotometer according to claim 2 wherein said first sector comprises a disc adapted to rotate about its axis and divided into the following eight regions having an equal central angle of 45° with respect to the axis:

a first region which does not substantially reflect the beam from the source to the reference beam path, a second region which does not substantially transmit the beam from the source to the sample beam path, a third region which reflects the beam from the source to the reference beam path, a fourth region which transmits the beam from the source to the sample beam path, a fifth region which does not substantially reflect the beam from the source to the reference beam path, a sixth region which transmits the beam from the source to the sample beam path, a seventh region which reflects the beam from the source to the reference beam path, and an eighth region which does not substantially transmit the beam from the source to the sample beam path, and said second sector comprises a disc adapted to rotate about its axis at a speed n times higher than the rotation speed of said first sector where n is an integer selected from 1, 2, and 4, said disc being alternately divided at an equal angle of 45°×n with respect to the axis into a region which transmits either one of the reference and sample beams to the monochromator and another region which reflects the other beam to the monochromator.

4. The spectrophotometer according to claim 1 wherein said optical system includes a first sector for distributing the light beam from said light source between the reference and sample beam paths to form reference and sample beams, respectively, and a second sector for guiding the reference and sample beams into the common beam path toward the monochromator, wherein said first and second sectors are coordinated such that said detector receives from said monochromator the following eight light inputs (a) to (h):

(a) radiant light from the sample cell which does not receive the light beam from the source, (b) radiant light from the reference cell which does not receive the light beam from the source, (c) the light beam transmitted by the sample cell which receives the light beam from the source, (d) the light beam transmitted by the reference cell which receives the light beam from the source, (e) radiant light from the sample cell which does not receive the light beam from the source, (f) the light beam transmitted by the reference cell which receives the light beam from the source, (g) the light beam transmitted by the sample cell which receives the light beam from the source, and (h) radiant light from the reference cell which does not receive the light beam from the source, in this sequence with a phase difference of 45 degrees in one cycle, and wherein said first frequency component in the output signal of the photodetector is a frequency component having a frequency in accord with said cycle and corresponding to said reference beam intensity, and said second frequency component is a frequency component having a frequency twice the frequency of said first frequency component and corresponding to the sample beam intensity, and said computing means functions to determine the ratio of the output of said second synchronous rectifier to the output of said subtraction means.

5. The spectrophotometer according to claim 4 wherein said first sector comprises a disc adapted to rotate about its axis and divided into the following eight regions having an equal central angle of 45° with respect to the axis:

a first region which does not substantially transmit the beam from the source to the sample beam path, a second region which does not substantially reflect the beam from the source to the reference beam path, a third region which transmits the beam from the source to the sample beam path, a fourth region which reflects the beam from the source to the reference beam path, a fifth region which does not substantially transmit the beam from the source to the sample beam path, a sixth region which reflects the beam from the source to the reference beam path, a seventh region which transmits the beam from the source to the sample beam path, and an eighth region which does not substantially reflect the beam from the source to the reference beam path, and said second sector comprises a disc adapted to rotate about its axis at a speed n times higher than the rotation speed of said first sector where n is an integer selected from 1, 2, and 4, said disc being alternately divided at an equal angle of 45°×n with respect to the axis into a region which transmits either one of the reference and sample beams to the monochromator and another region which reflects the other beam to the monochromator.

6. The spectrophotometer according to claim 1 wherein said optical system is constructed to continuously and concurrently guide the light beam from the source to both the reference and sample beam paths and includes a sector located at the crossing of the reference and sample beam paths for alternately guiding the reference and sample beams to the monochromator, said sector is switched among four states:
(a) a dark state interrupting both the sample and reference beams from passing,
(b) a first reference beam selecting state allowing only the reference beam to pass toward the monochromator,
(c) a sample beam selecting state allowing only the sample beam to pass toward the monochromator, and
(d) a second reference beam selecting state allowing only the reference beam to pass toward the monochromator in this order with a phase difference of 90° in one cycle, the first frequency component in the output signal of said photodetector is a component having a frequency in accord with said cycle, and the second frequency component is a component having a frequency twice the frequency of the first frequency component, and said computing means includes an adder circuit for adding the output of said subtraction means to the output of said second synchronous rectifier, and a circuit for determining the ratio of the output of said subtraction means to the output of said adder circuit.

7. The spectrophotometer according to claim 6 wherein the gain of that route along which the first frequency component signal travels from said discriminator means to said adder circuit is equal to the multiplication by $1/\sqrt{2}$ of the gain of that route along which the second frequency component signal travels from said discriminator means to said adder circuit.

8. The spectrophotometer according to claim 1 wherein said optical system is constructed to continuously and concurrently guiding the light beam from the source to both the reference and sample beam paths, and includes a first chopper for interrupting one of the reference and sample beams at a predetermined frequency and a second chopper for interrupting the other beam at a frequency integral times as high as the predetermined frequency, and said optical system is further constructed to guide the reference and sample beams to the monochromator, the first frequency component in the output signal of said photodetector is a component having the interrupting frequency of said first chopper, and the second frequency component is a component having the interrupting frequency of said second chopper, and said computing means functions to determine the ratio of the output of said subtraction means to the output of said second synchronous rectifier.

* * * * *